United States Patent
Tiburtius et al.

(10) Patent No.: US 6,917,613 B1
(45) Date of Patent: Jul. 12, 2005

(54) METHOD OF DELIVERING DATA AND REAL-TIME MEDIA UTILIZING A PACKET-SWITCHED NETWORK AND A CIRCUIT-SWITCHED NETWORK

(75) Inventors: Akilan Tiburtius, Montreal (CA); Zeng-Jun Xiang, Palatine, IL (US); Hanz Hager, Westmount (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 896 days.

(21) Appl. No.: 09/712,390

(22) Filed: Nov. 14, 2000

(51) Int. Cl.[7] .............................................. H04L 12/66
(52) U.S. Cl. ..................................................... 370/353
(58) Field of Search ................................ 370/352, 353, 370/354, 355, 314, 338, 229, 328, 400, 401, 402; 455/435.1, 436, 433, 455

(56) References Cited

U.S. PATENT DOCUMENTS 6,389,008 B1 * 5/2002 Lupien et al. ............... 370/352
6,463,055 B1 * 10/2002 Lupien et al. ............... 370/353
6,608,832 B2 * 8/2003 Forslow ....................... 370/353
6,707,813 B1 * 3/2004 Hasan et al. ................. 370/356

* cited by examiner

Primary Examiner—Chau Nguyen
Assistant Examiner—Ricardo Pizarro
(74) Attorney, Agent, or Firm—Smith, Danamraj & Youst, P.C.

(57) ABSTRACT

A method of delivering data and real-time media from a first mobile terminal to a second mobile terminal when the data is transferred through a packet-switched network, and the real-time media is transferred through a circuit-switched network. The real-time media is passed from the first mobile terminal to the second mobile terminal in a circuit-switched call, and the data is passed in a packet-switched data session. The second mobile terminal associates the circuit-switched call with the data session using binding information, such as an identifier of the first mobile terminal, passed to the second mobile terminal from the first mobile terminal. The real-time media and the data are then presented simultaneously to a user of the second mobile terminal.

17 Claims, 2 Drawing Sheets

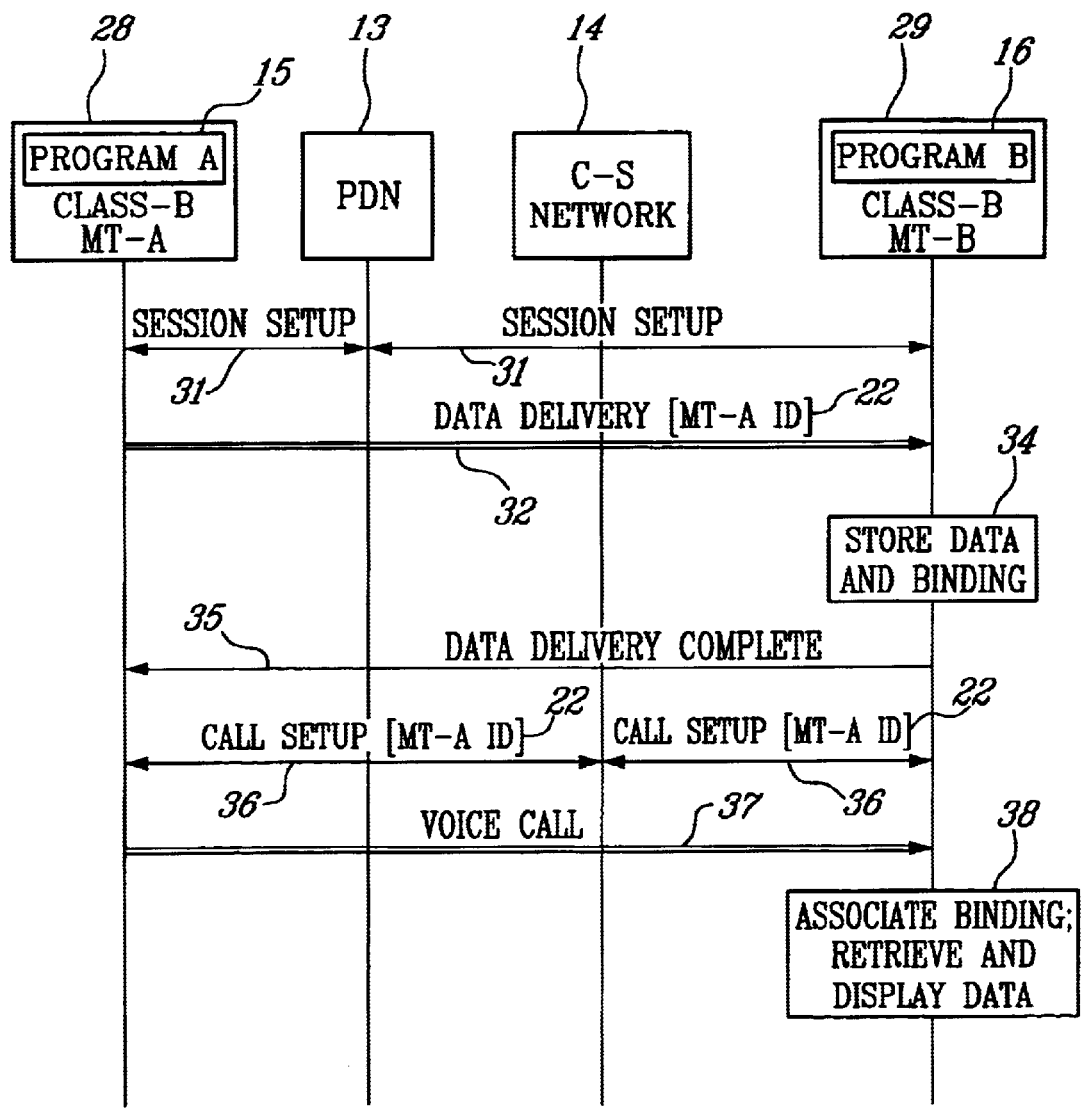

METHOD OF DELIVERING DATA AND REAL-TIME MEDIA UTILIZING A PACKET-SWITCHED NETWORK AND A CIRCUIT-SWITCHED NETWORK

BACKGROUND OF THE INVENTION

1. Technical Field of the Invention

This invention relates to radio telecommunication systems and, more particularly, to a method of delivering data and real-time media such as voice to a mobile terminal utilizing a packet-switched network and a circuit-switched network.

2. Description of Related Art

The telecommunications industry is currently in the process of developing a third generation (3G) all Internet Protocol (IP) radio telecommunications network that will be capable of simultaneous delivery of non-real-time packet data and real-time media such as voice. However, before 3G networks are deployed, it is anticipated that there will be a first phase of development during which real-time services such as voice will go through second generation (2G) circuit-switched networks while non-real-time packet data will go through networks such as the General Packet Radio Service (GPRS) or Enhanced Data Rates for GSM Evolution (EDGE) networks. Initially, the EDGE networks will be non-real-time networks. In the next phase, real-time EDGE services will be introduced.

While Class-A mobile terminals can access both data networks and circuit-switched networks at the same time, Class-B mobile terminals are limited to accessing one type of network at a time. Therefore in the first phase of development, a Class-B mobile terminal will be able to access real-time services such as voice from a circuit-switched network, or will be able to access non-real-time data services from an EDGE network, but cannot access both networks simultaneously. There is some level of coordination between the two types of networks for paging and location updating, but there is no way to associate a voice call in the circuit-switched network with a data session in the packet-switched network. Therefore, it is not possible to offer services in which there is interaction between the packet-switched and circuit-switched services.

It would be advantageous to have a method of delivering data and real-time media such as voice to a mobile terminal during the development of 3G networks that provides the appearance to the users that the services are both real-time. The present invention provides such a method.

SUMMARY OF THE INVENTION

In one aspect, the present invention is a method of delivering data and real-time media from a first mobile terminal to a second mobile terminal when the data is transferred through a packet-switched network, and the real-time media is transferred through a circuit-switched network. The method includes the steps of passing the real-time media from the first mobile terminal to the second mobile terminal in a circuit-switched call, passing the data from the first mobile terminal to the second mobile terminal in a packet-switched data session, and associating the circuit-switched call with the data session in the second mobile terminal using binding information passed to the second mobile terminal from the first mobile terminal. The real-time media and the data are then presented simultaneously to a user of the second mobile terminal.

In another aspect, the present invention is a method of delivering data from a first mobile terminal to a second mobile terminal through a packet-switched network. The method includes the steps of establishing a first data session between the first mobile terminal and the second mobile terminal, and passing, in connection with the first data session, an identifier of the first mobile terminal to a program in the second mobile terminal. The method also includes establishing a second data session between the first mobile terminal and the second mobile terminal, and passing, in connection with the second data session, the identifier of the first mobile terminal to the program in the second mobile terminal. The program then associates the first data session with the second data session by matching the identifier of the first mobile terminal received in connection with each session. Information from the first and second data sessions is then presented to a user of the second mobile terminal.

In another aspect, the present invention is a method of delivering data and real-time media from a first Class-A mobile terminal to a second Class-A mobile terminal when the data is transferred through a packet-switched network, and the real-time media is transferred through a circuit-switched network. The method includes the steps of setting up a circuit-switched call to pass the real-time media from the first mobile terminal to the second mobile terminal, and setting up a packet-switched data session during the circuit-switched call to pass the data from the first mobile terminal to the second mobile terminal. The data session is then associated with the circuit-switched call in the second mobile terminal using binding information passed from the first mobile terminal to the second mobile terminal. This is followed by simultaneously presenting the real-time media and the data to a user of the second mobile terminal.

In yet another aspect, the present invention is a method of delivering data and real-time media from a first Class-B mobile terminal to a second Class-B mobile terminal when the data is transferred through a-packet-switched network, and the real-time media is transferred through a circuit-switched network. The method begins by passing the data from the first mobile terminal to the second mobile terminal in a packet-switched data session. The data includes an identifier of the data session which may be an identifier of the first mobile terminal. The data and the identifier of the data session are then stored in the second mobile terminal. After the data session is complete, a circuit-switched call is set up to pass the real-time media from the first mobile terminal to the second mobile terminal. The identifier of the data session is passed to the second mobile terminal while setting up the circuit-switched call. The second mobile terminal then associates the data session with the circuit-switched call using the identifier of the data session as binding information between the session and the call. The data is then presented to a user of the second mobile terminal during the circuit-switched call.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a signaling diagram illustrating the flow of messages when delivering data and real-time media between Class-B mobile terminals in accordance with the teachings of the present invention.

DETAILED DESCRIPTION OF EMBODIMENTS

Figure 1:
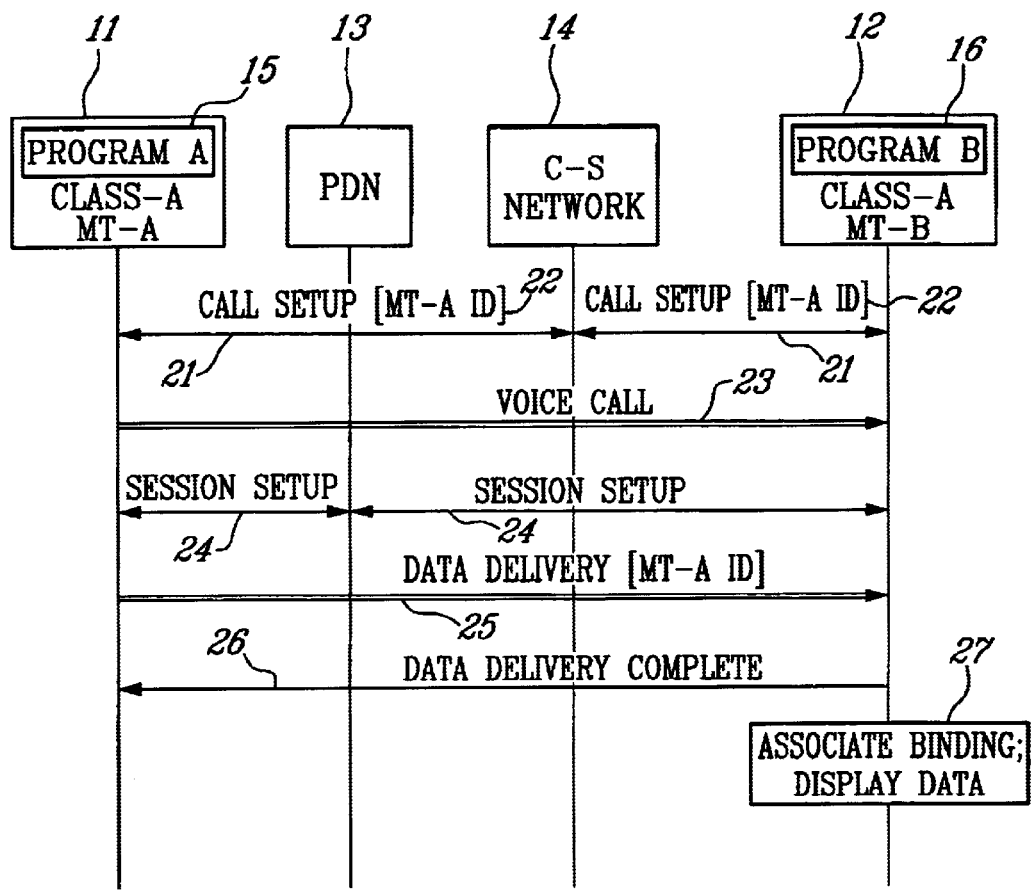
FIG. 1 is a signaling diagram illustrating the flow of messages when delivering data and real-time media between Class-A mobile terminals in accordance with the teachings of the present invention.

The present invention is a method of passing data and real-time media such as voice between mobile terminals in such a way that both services appear to the users to be real-time, even when the data is delivered through a non-real-time packet data network. For example, Party A may send a data file to Party B, and then may initiate a voice call to Party B. When this is done, the two calls/sessions are set up in two different networks, even though the users cannot tell. The present invention then binds the data session and the voice call together to provide the users with a richer set of services.

The preferred embodiment of the present invention binds together the data session and the voice call in the terminal itself. The terminal is a very powerful terminal capable of running application programs. When the data session is sent, binding information is passed from the originating terminal to the receiving terminal so that it knows that when the circuit-switched voice call is setup, the call is related to the packet data session.

The originating mobile terminal's Mobile Station Identity (MSID) or Electronic Serial Number (ESN) are suitable for use as the binding information. However, when setting up or conducting a data session using normal procedures, the originating terminal's MSID or ESN are not passed to the receiving mobile terminal. The present invention passes an identifier of the originating mobile terminal which may be its MSID, ESN, or any other suitable identifier. The ID information is passed as application-level data rather than adding it to the GPRS Attach protocol since it is desirable to implement the invention without modifying the network protocols. The ID information is passed during the data session in a format that Program B recognizes as a binding that is to be used to identify the data session when the receiving mobile terminal receives a circuit-switched call. The MSID or ESN are preferred as the binding information because the terminals will normally exchange one of those parameters when setting up the circuit-switched call, and the association of the data session to the circuit-switched call can then be made.

The present invention works with both-Class-A and Class-B mobile terminals. Class-A mobile terminals can perform a packet-switched session and conduct a circuit-switched voice call at the same time, but there is currently no mechanism for binding the data session and the voice call together. In the present invention, the mobile terminal associates different sessions being conducted on different networks, whether they are occurring simultaneously (Class-A) or not (Class-B).

FIG. 1 is a signaling diagram illustrating the flow of messages when delivering data and real-time media between Class-A mobile terminals in accordance with the teachings of the present invention. An originating Class-A mobile terminal (MT-A) 11 desires to establish a real-time voice call to a receiving Class-A mobile terminal (MT-B) 12, and send data during the voice call. Data is transferred from MT-A to MT-B through an IP Packet Data Network (PDN) 13, and voice calls are transferred through a 2G Circuit-Switched Network 14. The PDN is understood to include all nodes required to establish data sessions between the mobile terminals, such as Gateway GPRS Service Nodes (GGSNs), Serving GPRS Service Nodes (SGSNs), EDGE Base Stations (BSs), and non-real time EDGE radio support. Likewise, the Circuit-Switched Network is understood to include all nodes required to set up and conduct a voice call, such as BSs, Mobile Switching Centers (MSCs), and Home Location Registers (HLRs). MT-A includes an application program (Program A) 15, and MT-B includes an application program (Program B) 16. Program A and Program B communicate and exchange data at the application level.

At step 21, MT-A originates a circuit-switched voice call to MT-B, and call setup is conducted through the Circuit-Switched Network 14. During call setup, an identifier of MT-A (MT-A ID) 22 is passed to MT-B. The MT-A ID may be, for example, MT-A's MSID, ESN, Mobile Identification Number (MIN), International Mobile Station Identity (IMSI), or any other suitable identifier. The voice call is then delivered at 23. At some time after the voice call is started, the user of MT-A wants to share some data with the user of MT-B. So at 24, MT-A originates a packet data session, and session setup is conducted through PDN 13. Once the setup is complete, data delivery begins at 25. MT-A may provide its IMSI during the GPRS Attach procedure, and Program A then places this information in the application data being transferred to Program B. When the data delivery is complete, MT-B sends a Data Delivery Complete message 26 to MT-A. Program-B is programmed to associate the MT-A ID that was passed during call setup of the voice call with the MT-A ID passed in the application data. Thus at 27, Program-B associates the binding information, correlates the data session with the circuit-switched voice call, and displays the data to the user of MT-B.

If a third party starts a data session with MT-B during the call with MT-A, the binding information does not match. Therefore, Program-B will not present the received data to the MT-B user in the same way. For example, the user may only receive an indication that a data session is in progress, but the data is not displayed.

FIG. 2 is a signaling diagram illustrating the flow of messages when delivering data and real-time media between two Class-B mobile terminals 28 and 29 in accordance with the teachings of the present invention. Since Class-B mobile terminals cannot simultaneously access both a data network and a circuit-switched network, the sequence of events is different from that used with Class-A mobile terminals.

At step 31, MT-A initiates a data session, and the setup of the session with MT-B is conducted through the PDN 13. Once the setup is complete, data delivery begins at 32. The identifier of MT-A (MT-A ID) 22 is included in the application data delivered to Program B. As before, the MT-A ID may be, for example, MT-A's MSID, ESN, MIN, IMSI, or any other suitable identifier. For example, the IMSI may be provided by MT-A during the GPRS Attach procedure, and Program A can then place this information in the application data being transferred to Program B. Program B is programmed to recognize the MT-A ID as a binding that is to be used to identify the data session when MT-B receives a circuit-switched call.

When the data delivery is complete, Program B 16 stores the received data and MT-A ID at 34, and sends a Data Delivery Complete message 35 to MT-A. Upon receiving the Data Delivery Complete message, MT-A originates a circuit-switched voice call to MT-B, and call setup is conducted at 36 through the Circuit-Switched Network 14. Program A 15 may be programmed to cause MT-A to automatically originate the circuit-switched voice call without user intervention when the Data Delivery Complete message is received. During call setup, the MT-A ID 22 is passed to MT-B. The voice call is then delivered at 37.

Within MT-B, Program B recognizes the MT-A ID as the binding-information related to the data session and the stored data. Program B then retrieves the stored data and displays the data to the MT-B user at 38 during the voice call. In this manner, it appears to the users that both voice and data are being delivered in real time.

If the voice 37 call does not come through for some reason, MT-B continues to retain the stored data and to wait for the voice call because of the binding information that MT-B received. Several options exist at this point. First, the data may be displayed automatically to the MT-B user without the corresponding voice call. Second, the data may be displayed only when the MT-B user asks for it. Third, a time limit can be placed on the data, and it may be discarded after the time limit expires if an associated voice call has not been received. For example, Program B may display the data if a correlated voice call is received within the next minute. If not, the data may be retained until the MT-B user asks for it, or it may be discarded.

Thus, the present invention coordinates actions between two programs resident in Class-B mobile terminals and two networks to coordinate a data session and a voice call that are not going on at the same time. In essence, information is coordinated between the two sessions so that the users can experience it as semi-real time. To each of the users, the two distinct sessions appear as one session. From the originating user's perspective, he may send data such as a picture, document, music, etc. or a combination thereof to the receiving user, and then his mobile terminal automatically places a voice call to the same user. When the receiving user answers the call, the data is displayed to her at the same time that the voice call is going on. The data may even be displayed when the phone rings; it depends on the application-program. Thus, to both users, it appears to be a real-time application.

It should be noted that the method of the present invention can also be utilized to bind together different packet data sessions as well as a packet session and a circuit-switched call.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of delivering data and real-time media from a first mobile terminal to a second mobile terminal, said data being transferred through a packet-switched network, and said real-time media being transferred through a circuit-switched network, said method comprising the steps of:
    passing the real-time media from the first mobile terminal to the second mobile terminal in a circuit switched call;
    passing the data from the first mobile terminal to the second mobile terminal in a packet-switched data session;
    associating the circuit-switched call with the data session in the second mobile terminal using binding information passed from the first mobile terminal to the second mobile terminal; and
    simultaneously presenting the real-time media and the data to a user of the second mobile terminal.

2. The method of delivering data and real-time media of claim 1 wherein the mobile terminals are Class-A mobile terminals, and the step of passing the data from the first mobile terminal to the second mobile terminal in a packet-switched data session is performed while the circuit-switched call is on-going.

3. The method of delivering data and real-time media of claim 1 wherein the mobile terminals are Class-B mobile terminals, and the step of passing the data from the first mobile terminal to the second mobile terminal in a the packet-switched data session is performed before the circuit-switched call is originated.

4. A method of delivering data from a first mobile terminal to a second mobile terminal through a packet switched network, said method comprising the steps of:
    establishing a first data session between the first mobile terminal and the second mobile terminal;
    passing, in connection with the first data session, an identifier of the first mobile terminal to a program in the second mobile terminal;
    establishing a second data session between the first mobile terminal and the second mobile terminal;
    passing, in connection with the second data session, the identifier of the first mobile terminal to the program in the second mobile terminal;
    associating by the program, the first data session with the second data session by matching the identifier of the first mobile terminal received in connection with each session; and
    presenting information from the first and second data sessions to a user of the second mobile terminal.

5. A method of delivering data and real-time media from a first Class-A mobile terminal to a second Class-A mobile terminal, said data being transferred through a packet-switched network, and said real-time media being transferred through a circuit-switched network, said method comprising the steps of:
    setting up a circuit-switched call to pass the real time media from the first mobile terminal to the second mobile terminal;
    setting up a packet-switched data session during the circuit-switched call to pass the data from the first mobile terminal to the second mobile terminal;
    associating the data session with the circuit switched call in the second mobile terminal using binding information passed from the first mobile terminal to the second mobile terminal; and
    simultaneously presenting the real-time media and the data to a user of the second mobile terminal.

6. The method of delivering data and real-time media of claim 5 wherein the step of setting up a circuit-switched call includes setting up a voice call.

7. A method of delivering data and real-time media from a first Class-B mobile terminal to a second Class-B mobile terminal, said data being transferred through a packet-switched network, and said real-time media being transferred through a circuit-switched network, said method comprising the steps of:
    passing the data from the first mobile terminal to the second mobile terminal in a packet-switched data session, said data including an identifier of the data session;
    storing the data and the identifier of the data session in the second mobile terminal;
    setting up a circuit-switched call to pass the real time media from the first mobile terminal to the second mobile terminal after the data session is complete, said setting up step including the step of passing the identifier of the data session to the second mobile terminal;

associating the data session with the circuit switched call in the second mobile terminal using the identifier of the data session as binding information between the session and the call; and presenting the data to a user of the second mobile terminal during the circuit-switched call.

8. The method of delivering data and real-time media of claim 7 further comprising, before the step of setting up the circuit-switched call, the step of sending a message from the second mobile terminal to the first mobile terminal indicating that the data session is complete.

9. The method of delivering data and real-time media of claim 8 wherein the step of setting up the circuit-switched call includes the step of automatically originating the circuit-switched call by the first mobile terminal upon receiving the message from the second mobile terminal indicating that the data session is complete.

10. The method of delivering data and real-time media of claim 7 wherein the second mobile terminal includes an application program, and the steps of storing the data and the identifier of the data session, associating the data session with the circuit-switched call, and presenting the date to the user of the second mobile terminal are performed by the application program.

11. The method of delivering data and real-time media of claim 7 wherein the identifier of the data session is an identifier of the first mobile terminal that is passed during setup of the circuit switched call.

12. The method of delivering data and real-time media of claim 11 wherein the step of associating the data session with the circuit-switched call in the second mobile terminal using the identifier of the data session as binding information includes associating an identifier of the first mobile terminal received by the second mobile terminal during the data session and during setup of the circuit-switched call.

13. The method of delivering data and real-time media of claim 11 wherein the identifier of the first mobile terminal is selected from a group consisting of a Mobile Station Identity (MSID), a Mobile Identification Number (MIN), and an Electronic Serial Number (ESN).

14. A method of delivering data and real-time media from a first Class-B mobile terminal to a second Class-B mobile terminal, said data being transferred through a packet-switched network, and said real-time media being transferred through a circuit-switched network, said method comprising the steps of:

passing the data from the first mobile terminal to an application program in the second mobile terminal in a packet-switched data session, said data including an identifier of the first mobile terminal;

storing the data and the identifier of the first mobile terminal by the application program in the second mobile terminal;

sending a message from the second mobile terminal to the first mobile terminal indicating that the data session is complete;

automatically setting up a circuit-switched call by the first mobile terminal to pass the real-time media from the first mobile terminal to the second mobile terminal after the data session is complete, said setting up step including the step of passing the identifier of the first mobile terminal to the second mobile terminal;

associating the data session with the circuit switched call by the application program in the second mobile terminal, said program using the identifier of the first mobile terminal as binding information between the session and the call; and presenting the data to a user of the second mobile terminal during the circuit-switched call.

15. A mobile terminal receiving data and real-time media from another mobile terminal, said data being transferred through a packet-switched network, and said real-time media being transferred through a circuit-switched network, the mobile terminal comprising:

a program acting to receive the real-time media from the other mobile terminal through a circuit switched call, and to further receive the data from the other mobile terminal through a packet-switched data session;

wherein the program further associates the circuit-switched call with the data session using binding information passed from the other mobile terminal, and simultaneously presents the real-time media and the data to a user of the mobile terminal.

16. The mobile terminal of claim 15, wherein the mobile terminal and the other mobile terminal are Class-A mobile terminals, and the program of the mobile terminal receives the data from the other mobile terminal through the packet-switched data session while the circuit-switched call is ongoing.

17. The mobile terminal of claim 15, wherein the mobile terminal and the other mobile terminal are Class-B mobile terminals, and the program of the mobile terminal receives the data from the other mobile terminal through the packet-switched data session before the circuit-switched call is originated.

* * * * *